United States Patent [19]

Vogel

[11] Patent Number: 5,021,879
[45] Date of Patent: Jun. 4, 1991

[54] SYSTEM FOR TRANSMITTING VIDEO PICTURES

[75] Inventor: Peter Vogel, Diepersdorf, Fed. Rep. of Germany

[73] Assignee: U.S. Philips Corporation, New York, N.Y.

[21] Appl. No.: 590,450

[22] Filed: Sep. 24, 1990

Related U.S. Application Data

[63] Continuation of Ser. No. 442,475, Nov. 22, 1989, abandoned, which is a continuation of Ser. No. 185,608, Apr. 25, 1988, abandoned.

[30] Foreign Application Priority Data

| May 6, 1987 | [DE] | Fed. Rep. of Germany | 3715067 |
| May 7, 1987 | [DE] | Fed. Rep. of Germany | 3715147 |
| Aug. 10, 1987 | [DE] | Fed. Rep. of Germany | 3726520 |
| Dec. 28, 1987 | [DE] | Fed. Rep. of Germany | 3744280 |

[51] Int. Cl.$^5$ .......................... H04N 7/18; H04N 7/12
[52] U.S. Cl. .................................... 358/105; 358/135; 358/136
[58] Field of Search ................. 358/105, 133, 135, 136

[56] References Cited

U.S. PATENT DOCUMENTS

| 4,460,923 | 7/1984 | Hirano et al. | 358/136 |
| 4,591,907 | 5/1986 | Catros | 358/136 |
| 4,689,671 | 8/1987 | Ohki et al. | 358/135 |
| 4,723,161 | 2/1988 | Koza | 358/136 |
| 4,731,664 | 3/1988 | Nishiwaki et al. | 358/136 |

Primary Examiner—John K. Peng
Attorney, Agent, or Firm—Edward W. Goodman

[57] ABSTRACT

A system for transmitting video pictures includes a hybrid encoder which encodes the incoming data of a video picture in blocks. Preferably, at the receiver end a hybrid decoder cancels the encoding steps of the hybrid encoder. The incoming blocks of a video picture are transformed inter alia by a transform unit (T) and quantized by a quantizer (Q). In order to adapt the system to transmission bit rates of between 64 kbit/s and 2 Mbit/s in an optimum manner, a structuring unit (SE) is provided which combines a plurality of blocks, which represent a coherent section of a video picture, to one macro-block. It assigns a macro-attribute to each macro-block from which attribute it can be derived which properties are identical for all sub-blocks of the macro-blocks and which are not. Such properties are, for example, records about the motion vector of each sub-block, which vector may be the same, for example, for all sub-blocks. When using a separate macro-attribute (NON), there is no property which can be considered to be the same for all sub-blocks of a macro-block, but the properties are assigned to each sub-block proper. If required, the macro-blocks themselves are again treated as sub-blocks, i.e. they are combined to still larger units. When transmitting stationary pictures, a very effective encoding is the result.

18 Claims, 2 Drawing Sheets

SYSTEM FOR TRANSMITTING VIDEO PICTURES

This is a continuation of application Ser. No. 442,475, filed Nov. 22, 1989 which is a continuation of Ser. No. 185,608 filed Apr. 25, 1988, now abandoned.

BACKGROUND OF THE INVENTION

1. Field of the Invention

The invention relates to a system for transmitting video pictures by means of a hybrid encoder for encoding the data of an incoming video picture in blocks, the data of the previous video picture being stored in a picture memory of the hybrid encoder and being compared blockwise with the blocks of the incoming video picture, the result of the comparison for each block to be encoded leading to main and side information, the main information comprising data about the elements of a transformed and quantized block and the side information comprising data about the following block attributes:

a) the transformed and quantized block is the difference block or the original block,
b) the motion vector is zero or not zero,
c) the main information consists of zeros only or does not consist of zeros only.

If desired, said system may further comprise a hybrid decoder for performing operations reverse to the encoding steps of the hybrid encoder.

2. Description of the Related Art

A system having the above-mentioned functional features is described in the document #141 of CCITT of September 1986 (compare CCITT SGXV, Working Party XV/1, Specialist Group on Coding for Visual Telephony, document #141, Sept. 12, 1986, p. 5).

The main purpose of a hybrid encoder for such a system is to encode the video data coming from a video data source with a minimum possible loss of information into a signal with a minimum possible bit rate.

In this process two encoding principles - hence the name hybrid encoder - are used:

the interframe principle
in which the correlation between temporally sequential video pictures is utilized (this designation is used for full pictures and sub-pictures), and the intraframe principle
in which the correlation of the video data within a video picture is utilized.

Before the actual encoding process, it is necessary to prepare the video data:

The video data are applied in so-called blocks to the encoder. Such a video data block (hereinafter also referred to as block or data block) comprises the data of given picture elements of a video picture which are considered to be elements of a quadratic numeral matrix. For example, a video data block may consist of the chrominance values of the first eight picture elements of the first eight lines of a video picture. Each video picture is split up into equally large data blocks.

The 8×8 video blocks of the incoming video picture are compared by means of the known hybrid encoder with corresponding blocks of the previous picture which are stored in a picture memory. The result of the comparison - the result block - is either the difference between the two blocks or the block of the incoming video picture. Details will be given hereinafter.

The block of the previous video picture corresponding to a block of the incoming video picture is herein understood to mean the block having the greatest conformity with the block of the incoming video picture.

This may be that block of the previous video picture which has the same location as the incoming block in the video picture, or a block which is displaced with respect to the location of the incoming block. The latter case often occurs in video pictures in which persons or objects move in front of a steady background. The displacement is indicated by a motion vector. This vector may also be the zero vector; in that case corresponding blocks have the same location in successive video pictures. The result block (the difference block or the original block) is then subjected to a Fourier transform (compare, for example, German Patent Application P36 13 393.4) and is subsequently quantized. If no element of the block is significantly different from zero after the quantization, the block is not transmitted. If the value of an element of the block is at least higher than a threshold, a Huffman encoding is performed and the values of the block are written as main information in a buffer memory. The data of successive blocks are separated by an END-OF-BLOCK symbol.

The following so-called side information is written in an encoded form in the buffer memory:
1. The motion vector is zero or not zero
2. The transformed and quantized block is the difference block or the original block;
3. The main information consists of zeros only or does not consist of zeros only;
4. The components of the motion vector; and
5. The magnitude of the quantization intervals of the adaptive quantizer.

Main and side information of the blocks are then read from the buffer memory with a temporally constant bit rate and transmitted to a receiver, and this in such a way that the receiver with its hybrid decoder is capable of splitting up the information relating to a block into main and side information and of reversing the individual encoding steps.

The block size, i.e. the number of picture elements, combined in a quadratic block is conventionally a power of two in video picture encoding. Blocks having a size of 8×8 or 16×16, i.e. quadratic blocks with data of 64 or 256 picture elements are significant. It will be readily evident that the processing time of blocks increases as their number of elements increases. In the case of fast encoders, i.e. those envisaged for high transmission bit rates, large blocks will therefore be more unfavorable than smaller blocks due to their considerable processing time. On the other hand, the ratio between main and side information will be in favor of side information in the case of small blocks, which reduces the encoding efficiency. The block size is thus the result of a compromise.

If a system of the type described in the opening paragraph were used for 8×8 blocks, for example, for a transmission bit rate of 64 kbit/s and a conventional picture frequency of 10 Hz, the transmission bit rate would not even be sufficient for transmitting the occurring side information, as will be elucidated hereinafter.

SUMMARY OF THE INVENTION

It is an object of the invention to provide a system of the type described in the opening paragraph which can be adapted in an optimum manner to transmission bit rates of between 64 kbit/s and 2 mbit/s.

This object is realized in that the hybrid encoder combines a plurality of blocks, which represent a coherent section of a video picture, into a macro-block, in that it assigns a macro-attribute to each macro-block, and in that it can be derived from each macro-attribute which side information is either identical or not identical for all sub-blocks of the macro-block.

In one embodiment, the hybrid encoder assigns a separate macro-attribute to a macro-block if it does not assign any of the remaining macro-atrributes to this macro-block, in which case the hybrid encoder assigns all side information to the separate sub-blocks of this macro-block.

The system according to the invention has the advantage that encoding can be carried out iteratively in a simple way, i.e. the components of a macro-block defined above as sub-blocks may themselves be composed of even smaller blocks so that they are macro-blocks themselves. The use of the separate macro-attribute (NON) means a complete transition to the "next lower encoding plane" in which all side information of a sub-block is assigned to this block. The separate attribute NON may be associated with this side information, which would lead to a further transition to another "encoding plane", and so forth. The system according to the invention is, for example, capable of encoding two successive identical video pictures in a single macro-block whose main information consists of zeros only, while the information to be transmitted essentially also consists of zeros only. This also applies to identical parts of two successive video pictures.

If the transmission bit rate is low, the system can be adapted to the transmission bit rate in an optimum manner in that macro-attributes, which imply that all side information of the sub-blocks is considered to be identical, are predominantly used during encoding. For adaptation to higher bit rates a possibly low encoding plane may often be used, for example, by possibly frequent use of the separate attribute NON.

The invention will now be described in greater detail, by way of example, with reference to the accompanying drawings.

DETAILED DESCRIPTION OF THE PREFERRED EMBODIMENTS

The embodiments are based on the recognition that encoding is carried out on not more than two "encoding planes", i.e. the components of a macro-block designated as sub-blocks are the smallest occurring blocks, so that the sub-blocks are not composed of blocks which are even smaller. The quantity of the sub-block side information therefore does not comprise the separate attribute NON which - as stated hereinbefore - designates a transition to a subsequent lower "encoding plane", i.e. a transition to even smaller blocks.

The following abbreviations will be used to designate the attributes of a sub-block:
a: The transformed and quantized sub-block is the original block.
$\underline{a}$: The transformed and quantized sub-block is not the original block but the difference block.
b: The motion vector is zero.
$\underline{b}$: The motion vector is not zero.
c: The main information of the sub-block consists of zeros only.
$\underline{c}$: The main information of the sub-block does not consist of zeros only.

Figure 1:
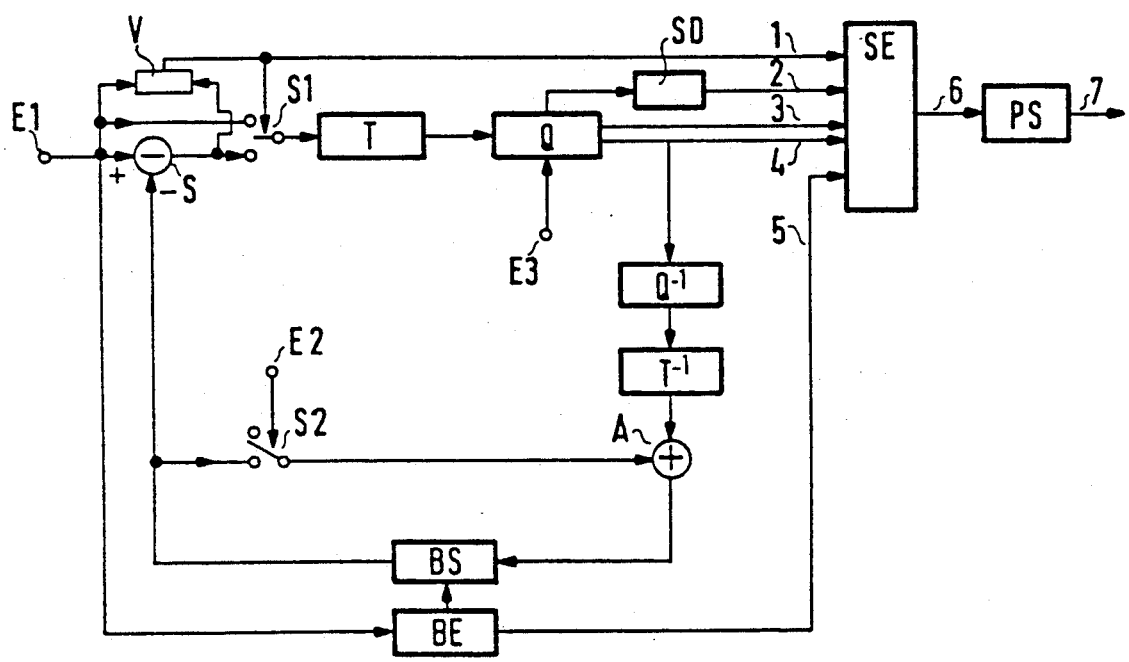
FIG. 1 shows a hybrid encoder having the characteristic features of the invention.

FIG. 1 shows an encoder whose smallest sub-blocks have an 8×8 block structure (the sub-block is thus quadratic and comprise 64 elements). The input blocks, which are components of an incoming video picture and which are applied to the encoder at a terminal E1, also have an 8×8 block structure. The shorter designation "block" will hereinafter be used for the input blocks as well as for the sub-blocks in those cases where confusion is not to be feared.

An 8×8 block of the incoming video picture is applied to an input of a subtractor S. The corresponding block of the previous video picture stored in a picture memory BS is applied to the other input of the subtractor S. The difference block appears at the output of the substractor S; it is initially applied to an input of a comparator V which compares the incoming block with the difference block. If there is no essential difference between the elements of the incoming block and those of the difference block, the comparator V applies a codeword via a line 1 to a structuring unit SE by which codeword the contents of the record a (see above) are encoded. This codeword also controls the two controllable switches S1 and S2, while the control input E2 of the controllable switch S2 is connected to the line 1. The switch S1 then assumes a position in which the incoming block is directly applied to a transform unit T. The switch S2 is set to a position in which the connection between the output of the picture memory BS and the input of an adder A is interrupted. If the difference between the incoming block and the difference block is significant, the comparator V supplies a signal of the contents $\underline{a}$ (see above) which controls the controllable switch in such a way that the difference block is applied to the transform unit T and the connection between the output of the picture memory BS and the input of the adder A is re-established.

The transform unit T carries out a Fourier transform with the blocks. The elements of the transformed blocks are applied to a quantizer Q. The magnitude of the quantization intervals is changed by a control signal which is present at a terminal E3. This signal is supplied by a buffer memory PS and gives information about its degree of filling. If the buffer memory PS tends to overflow, the length of the quantization intervals is extended, i.e. a coarser quantization is selected. If the buffer memory PS tends to run empty, the quantization is refined. The transformed and quantized block—thus the main information of a block—is then applied via a line 4 to the structuring unit SE. The line 4 also conveys side information indicating the end of a block. The side information about the magnitude of the quantization intervals is passed from the quantizer Q via a line 3 to the structuring unit SE. A threshold detector SD checks whether the elements of a transformed and quantized block are all under or not under a threshold. It applies the encoded attribute c or $\underline{c}$ (see above) via a line 2 to the unit SE.

The signal on the line 4 is also applied via a feedback branch to the input of the hybrid encoder, namely via a unit $Q^{-1}$ which substantially reverses the effect of quantizer Q. The same applies to the unit $T^{-T}$ which is arranged subsequent to the unit $Q^{-1}$ and reverses the effect of the unit T. The output of the unit $T^{-1}$ is connected to an input of an adder A whose second input can be connected to the output of the picture memory BS via the switch S2. If the fed-back block decoded by the units $Q^{-1}$ and $T^{-1}$ is a difference block, the switch S2 establishes the connection between the picture memory and the adder A; the adder A thereby cancels the difference formation. The block of the incoming video picture is thus written in the picture memory BS via the feedback branch and takes over the role of the corresponding block of the previous video picture.

A motion estimator BE, to which the blocks of the incoming video picture are also applied directly, compares these blocks with the blocks stored in the picture memory BS; it determines that block in the picture memory (only in the case of the luminance values) which shows the greatest conformity with the incoming block and then applies a codeword as side information via a line 5 with the contents of the record b or b (see above) to the structuring unit SE. If the record b is connected, the components of the motion vector are also applied via the line 5 to the structuring unit SE. The motion vector indicates how blocks of the same content between two successive video pictures are displaced with respect to one another.

The structuring unit SE now combines four 8×8 blocks, which represent a quadratic section of a video picture, into one macro-block, i.e. to one 16×16 block. A macro-attribute is then assigned to each macro-block. The following abbreviations will be introduced to describe the macro-attributes:

u: All transformed and quantized sub-blocks are difference blocks.
v: The motion vector is zero for all four sub-blocks.
w: The main information consists of zeros only for all sub-blocks.
w̲: The main information does not consist of zeros only for all sub-blocks.
x: All sub-blocks are original blocks.
y: For all sub-blocks the motion vector has the same value different from zero.

In the relevant embodiment the following macro-attributes are used for luminance values:
1. u v w,
2. x.
3. u v w̲,
4. u y w̄,
5. u y w̲.

The juxtaposition of characters is the logical conjunction of their records. The use of the macro-attributes 3 and 5 requires side information to be provided at the next lower encoding plane. The reason is that it should be recognizable in which sub-block the main information consists of zero only. If the END-OF-BLOCK symbol, which is available anyway, is used as this sub-block side information, separate devices for storing and introducing such a sub-block side information are not necessary.

The following macro-attributes are provided for chrominance values:
6. u v w,
7. x,
8. u v w̲.

Since no motion estimation is performed at the chrominance values, all attributes in which the motion vector has a value different from zero are cancelled.

In both cases the separate macro-attribute is designated by NON and is used if either the macro-attributes 1-5 or the macro-attributes 6-8 are not used. The following applies in the case of using macro-attributes:

A macro-attribute having, for example, the record v (see above) does not mean that the motion estimator BE has found the zero vector as motion vector for all four sub-blocks; in the sense of an optimization - which cannot be given in this context - it may rather be more favourable to ignore the difference and to treat the sub-blocks in such a way as if all of them have a zero value motion vector. This decision is taken by the structuring unit SE, based on the optimization programs stored in this unit. Similar considerations apply to other partial records of the macro-attributes. The attribute NON need not be used either, as will hereinafter be explained with reference to a further embodiment.

Table 1 is an encoding table which shows with which codewords (binary) the macro information is to be encoded. If the motion vectors for all sub-blocks are equal in the case of the luminance values, they are represented by an eight-digit binary codeword as is shown in Table 1.

If the macro-attributes 3, 5, 8 or NON are used, side information should be partly or exclusively assigned to the sub-blocks. The following sub-block attributes are associated with this sub-block side information:
9. a b c,
10. a,
11. a b c,
12. a̲ b̲ c̲,
13. a̲ b̲ c.

For chrominance values the sub-block attributes are:
14. a b c,
15. a
16. a b c.

The juxtaposition of the characters has the same significance as in the case of the macro-attributes. Table 2 shows by which Huffman codewords the sub-block attributes are to be encoded. If in the case of luminance values the motion vector of a sub-block differs from zero, it is also transmitted by means of a 8-digit binary word.

If, as stated above, the END-OF-BLOCK symbol, which is available anyway, is used as a sub-block attribute, the number of sub-block side attributes to be given is reduced to the records, a, a̲, b̲ c̲ and a b c in the case of the luminance values and to the additional sub-block attributes a and a b̲ c in the case of the chrominance values. Table 3 shows which Huffman codewords are to be used in this case. If the components of a motion vector are to be assigned to a sub-block, they are again encoded by means of an 8-digit binary codeword.

The following embodiment relates to a case in which the separate macro-attribute NON is not used. However, the effectiveness of a system according to the invention as compared with a system having a fixed block structure will be described first.

Table 4 shows the data of an arbitrary video picture comprising 288 lines and 352 columns, thus a total of 101376 pixels. The luminance values are split up into 1584 quadratic blocks of 64 pixels each and the chrominance values are split up into 792 blocks of the same size. For the attributes of such 8×8 blocks the same abbreviations are used as for the sub-blocks described with reference to the first embodiment.

Side information which is to be transmitted with a block again comprises the record-logical conjunction of the cumulated attributes for a sub-block as described with reference to the first embodiment. To characterize such information the symbols for the single attributes in column 1 of Table 4 are juxtaposed. Thus, e.g. the record a b c means that the block provided with this side information is the difference block of two successive pictures, that its motion vector is zero and that the main information of the block does not consist of zeros only.

The second column in Table 4 indicates how many blocks of a picture have been transmitted with the side information indicated in column 1 and the third column indicates by which codeword the side information has been encoded.

No motion vector is determined for the chrominance value and therefore only side information comprising the attribute b occurs. In Table 4 the last line but one, which relates to the luminance values, also includes the motion vector as side information. The number of blocks (column 2) for which the motion vector is not zero is the sum of the number of blocks comprising the attribute b. The two components of the motion vector are jointly encoded by 8 bits as can be seen in column 3 which leads to a total of 3152 bits for the motion vectors of the video picture concerned.

The last line of Table 4 states the total number of bits required for encoding the cumulated side information. The result (last line, fourth column) shows that the number of bits per second for the side formation mentioned in Table 4 is larger than the presupposed transmission bit rate of 64 kbit/s. This record is based on the assumption that the picture frequency is 10 Hz and that the total number of bits stated in Table 4 is typical of all video pictures.

The records of Table 4 lead to the inevitable conclusion that a hybrid encoder is not usable in the case of a picture frequency of 10 Hz and when using 8×8 blocks for transmission bit rates of 64 kbit/s because main information can no longer be transmitted. As stated in column 4, last line of Table 4, the reason is that the side information for each video picture is of the order of 6800 bits in which the side information indicating the end of a block and the value of the quantization intervals is not even included. A bit rate of 64 kbit/s would not be sufficient for all side information.

However, if two "encoding planes" are used according to the invention, the structuring unit SE combines four 8×8 blocks, which represent a quadratic section of a video picture, to one macro-block. It determines an average motion vector from the motion vector of the sub-blocks of a macro-block and assigns this vector to the macro-block. Then it is checked which of the following records relate to a macro-block (macro-attributes):

u: All transformed and quantized sub-blocks are difference blocks u̲: Not all transformed and quantized sub-blocks are difference blocks, but at least one of them is the original block.

v: The motion vector is zero for all sub-blocks.

v̲: The motion vector is not zero for all sub-blocks.

w: The main information only consists of zeros only for all sub-blocks.

w̲: The main information does not consist of zeros only for all sub-blocks.

The macro-attributes - as a quantity they are not identical to the macro-attributes of the first embodiment—can be combined to a total of eight mutually excluding macro side information components of the form u v w (see above). The structuring unit SE assigns a codeword to each combination, which codeword precedes the four sub-blocks of a macro-block when all information is written in the buffer memory PS via the line 6.

The codewords used are stated in Table 5; Table 2 also shows that not all combinations of the form u v w lead to a different codeword. The reason will become clear hereinafter. It is important that the receiver to which all information is transmitted via the line 7 in FIG. 1 can assign one of the sub-block side information components stated in Table 4 to each 8×8 block. If the macro side information is, for example, u v w, the same sub-block side information, namely a b c is associated with each sub-block. If the macro-side information is, however, u v w̲, a side information having the content of the record c or c̲ precedes each sub-block in order that it is made clear which sub-block side information is to be assigned to which sub-block.

In the relevant embodiment the components of the motion vector are always given as macro information. The receiver thus assigns the same motion vector to each sub-block of a macro-block. It is true that this leads to a small loss of quality when displaying the picture at the receiver end, but it reduces the number of bits to be transmitted for the motion vectors of a video picture to a considerable extent as is proved by the comparison of the seventh line of Table 5 with the corresponding line of Table 4. The data preceding each sub-block as sub-block side information during transmission require at most two bits. The bit-saving encoding according to the invention is illustrated in Table 5. The side information of the luminance values of an arbitrary video picture requires 867 bits, without the components of the motion vectors and 1731 bits with the components of the motion vectors.

The total side information of the chrominance values requires 379 bits, as is shown in Table 5. The last line of Table 5 shows that in a system according to the invention approximately $\frac{1}{3}$ of the number of bits is required for side information as compared with a system in which encoding is effected in accordance with Table 4.

Table 5 also shows that different codewords are not provided for all macro-side information. The distinction whether for all four sub-blocks the main information should consist of zeros only (w) or should not consist of zeros only (w̲) has not been made for statistical reasons. It is more favorable, i.e. it generally requires fewer bits, to make this distinction on the "micro-plane" and to have each sub-block preceded by micro-side information with the content of the record c or c̲ (see above).

For the same reasons macro-attributes such as, for example, "All four sub-blocks are original blocks" are not used.

Figure 2:
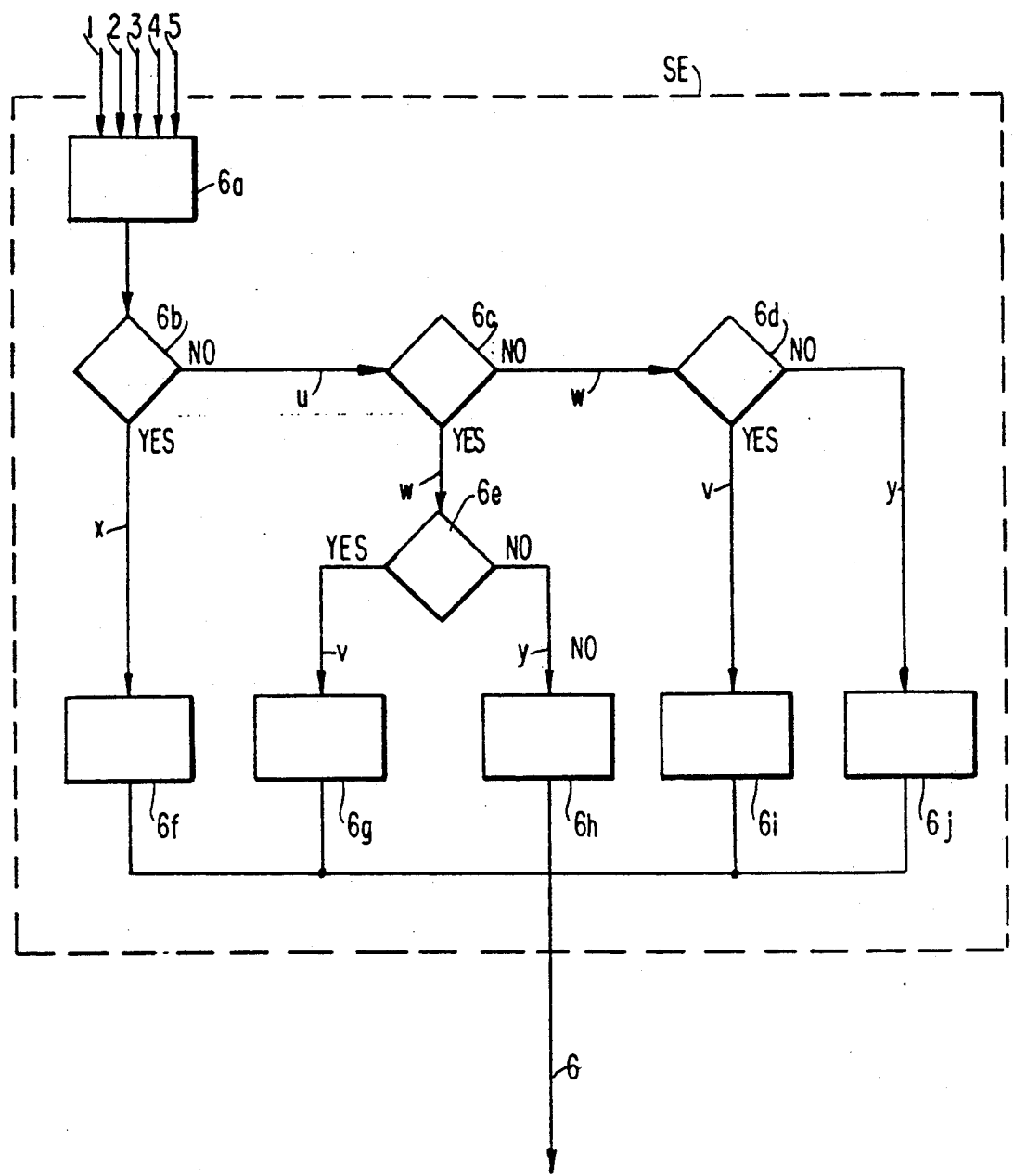
FIG. 2 shows a partial block diagram and flowchart for the structuring unit SE of FIG. 1.

While stating the measures which are characteristic of the invention, the operation of the structure unit SE will be described in greater detail with reference to a specific case. FIG. 2 shows the structuring unit SE in a representation which is equivalent to a flowchart. An input unit 6a reads and stores four successive 8×8 (sub-)blocks of a video picture with the associated side information via the lines 1, 2, 3, 4 and 5. A special aspect is that almost all side information for the four sub-blocks which have been read is equal. The only exception is the side information indicating that the main information of a (sub-) block consists of zeros only or does not consist of zeros only. It is specific of a sub-block.

The stored data are processed by four interrogation units 6b, 6c, 6d and 6e, each activating one of five output units 6f to 6j. Dependent on the interrogation result, the output units 6f to 6j apply distinct output data to the buffer memory PS via the line 6.

The possible interrogation result supplied by any one of the interrogation units is designated by YES or NO. The interrogation result also establishes which one of the macro-attributes pertains to the four-blocks. The appropriate attribute is also shown in the Figure.

The interrogation unit 6b checks whether or not the four stored 8×8 sub-blocks are original, i.e. whether the record a or $\underline{a}$ holds for the stored blocks. In the affirmative case, i.e. if all sub-blocks are original blocks, the output unit 6f is activated. It first transmits the macro-attributes x (cf. Table 1), subsequently transmits the data of the first block in a special code (compare, for example, U.S. Pat. No. 4,091,075), followed by an END-OF-BLOCK symbol, and then supplies in the same code the data of the second, third and fourth blocks, each with an END-OF-BLOCK symbol, to the buffer memory PS. If the main information of a sub-block consists of zeros only, only one END-OF-BLOCK symbol is supplied.

If the result of the interrogation by the interrogation unit 6b is negative, the second interrogation unit 6c checks whether the main information of all sub-blocks consists of zeros only (whether the record c holds for all sub-blocks). If affirmative and negative, an interrogation by the interrogation units 6e and 6d, respectively, follows. The two interrogation units 6e and 6d check whether the motion vectors of the four sub-blocks have the value of zero.

Two cases can be distinguished, if the motion vectors have the value of zero. In the first case, which is characterized by the macro-attributes u and w, the interrogation unit 6e activates the output unit 6g which in its turn transmits the macro-attribute uvw (cf. Table 1). In the second case, which is characterized by the macro-attributes u and $\underline{w}$, the interrogation unit 6d activates the output unit 6i which consecutively transmits the macro-attribute uv$\underline{w}$ and the main information of the four blocks, each of which is followed by an END-OF-BLOCK symbol, to the buffer memory PS.

If the result of the interrogation by the interrogation units 6d and 6e is negative (NO), i.e. if the motion vector of all blocks is equal, but different from the zero vector, either the output unit 6j or the output unit 6h is activated. The output unit 6h supplies as macro-attributes the magnitude uvw and the components of the motion vector to the buffer memory PS.

Whenever the output unit 6j is activated, it supplies the macro-attribute uy$\underline{w}$ and the encoded magnitude of the quantization intervals. Likewise as for the macro-attribute x, these macro-attributes are followed by main and side information for the four sub-blocks. This information consists only of an END-OF-BLOCK symbol for a sub-block, if the main information comprises zeros only, and consists of the main information followed by an END-OF-BLOCK symbol, if the main information does not comprise zeros only.

TABLE 1

| Macro-side-information | Codeword (binary) |
|---|---|
| Luminance values | |
| u v w | 0 |
| x | 11110 |
| u v $\underline{w}$ | 110 |
| $\underline{u}$ y w | 1110 |
| u y $\underline{w}$ | 10 |
| NON | 11111 |
| Motion vector components | xxx xxx xx |

TABLE 1-continued

| Macro-side-information | Codeword (binary) |
|---|---|
| Chrominance values | |
| u v w | 0 |
| x | 110 |
| u v $\underline{w}$ | 10 |
| NON | 111 |

TABLE 2

| Sub-block side information | Codeword (binary) |
|---|---|
| Luminance values | |
| $\underline{a}$ b c | 0 |
| a | 1110 |
| $\underline{a}$ b c | 1111 |
| $\underline{a}$ b $\underline{c}$ | 10 |
| $\underline{a}$ b $\underline{c}$ | 110 |
| Motion vector components | xxx xxx xx |
| Chrominance values | |
| $\underline{a}$ b c | 0 |
| a | 11 |
| $\underline{a}$ b c | 10 |

TABLE 3

| Sub-block side information | Codeword (binary) |
|---|---|
| Luminance values | |
| a | 11 |
| $\underline{a}$ b $\underline{c}$ | 0 |
| $\underline{a}$ b $\underline{c}$ | 10 |
| Motion vector components | xxx xxx xx |
| Chrominance values | |
| a | 1 |
| $\underline{a}$ b $\underline{c}$ | 0 |

TABLE 4

| Sub-block side information | Number of blocks | Codeword (binary) | Number of bits for side information |
|---|---|---|---|
| Luminance values | | | |
| a | 56 | 0000 | 224 |
| $\underline{a}$ b c | 1123 | 1 | 1123 |
| $\underline{a}$ b $\underline{c}$ | 11 | 001 | 33 |
| $\underline{a}$ b c | 327 | 0001 | 1308 |
| $\underline{a}$ b $\underline{c}$ | 67 | 01 | 134 |
| Motion vector components | 394 | xxxxxxxx | 3152 |
| Sub-total | | | 5974 |
| Chrominance values | | | |
| a | 13 | 10 | 26 |
| $\underline{a}$ b c | 752 | 1 | 752 |
| $\underline{a}$ b $\underline{c}$ | 27 | 10 | 54 |
| Total | | | 6806 |

TABLE 5

| Macro-side information | Codeword (binary) | Number of bits for side information of the macro- and sub-blocks |
|---|---|---|
| Luminance values | | |
| u v w | 0 | 867 |
| u v $\underline{w}$ | 101 | |
| u $\underline{y}$ w | 100 | |

TABLE 5-continued

| Macro-side information | Codeword (binary) | Number of bits for side information of the macro- and sub-blocks |
|---|---|---|
| u v w | | |
| u v w | 110 | |
| u v w | | |
| u v w | 111 | |
| u v w | | |
| Motion vector components | xxx xxx xx | 864 |
| Sub-total | | 1 731 |
| Chrominance values | | |
| u w | 0 | 379 |
| u w | 10 | |
| u w | 11 | |
| Total | | 2 110 |

What is claimed is:

1. A system for transmitting video pictures by means of a hybrid encoder for encoding the data of an incoming video picture in blocks, the data of the previous video picture being stored in a picture memory of the hybrid encoder and being compared blockwise with the blocks of the incoming video picture, the result of the comparison for each block to be encoded leading to main and side information, the main information comprising data about the elements of a transformed and quantized block and the side information also comprising data about the following block attributes:
   a) the transformed and quantized block is the difference block of the original block,
   b) the motion vector is zero or not zero,
   c) the main information consists of zeros only or does not consist of zeros only,
characterized in that the hybrid encoder combines a plurality of blocks, which represent a coherent section of a video picture, to a macro-block, in that it assigns a macro-attribute to each macro-block, and in that it can be derived from each macro-attribute which side information is either identical or not identical for all sub-blocks of the macro-block.

2. A system as claimed in claim 1, characterized in that the hybrid encoder assigns a separate macro-attribute (NON) to a macro-block if it does not assign any of the remaining macro-attributes to this block, in which case the hybrid encoder assigns all side information to the separate sub-blocks of said macro-block.

3. A system as claimed in claim 1, characterized in that the END-OF-BLOCK symbol is used as side information for sub-blocks if the main information of a sub-block consists of zeros only.

4. A system as claimed in claim 1, characterized in that the hybrid encoder determines the motion vector for macro-blocks only.

5. A system as claimed in claim 1, characterized in that macro-attributes, from which it can be derived that side information is identical for all sub-blocks of a macro-block, is only used by the hybrid encoder if its use leads to a smaller number of bits for the side information as compared with the case in which the hybrid encoder would assign side information of the same content to each sub-block.

6. A system as claimed in claim 1, characterized in that the hybrid encoder treats macro-blocks like sub-blocks.

7. A system as claimed in claim 1, characterized in that the following macro-attributes are provided for luminance values:

1. u v w,
2. x,
3. u v w,
4. u y w,
5. u y w, in which the characters u, v, w, x and y represent the following records:
   u: All sub-blocks are difference blocks,
   v: The motion vector is zero for all sub-blocks,
   w: The main information consists of zeros only for all sub-blocks,
   x: All sub-blocks are original blocks,
   y: The motion vector has the same value different from zero for all sub-blocks, The underlined characters being the negation and the juxtaposition of characters representing the logical conjunction of their associated records.

8. A system as claimed in claim 7, characterized in that the hybrid encoder assigns a separate macro-attribute (NON) to a macro-block if it does not assign any of the remaining macro-attributes to this block, in which case the hybrid encoder assigns all side information to the separate sub-blocks of said macro-block.

9. A system as claimed in claim 8, characterized in that the END-OF-BLOCK symbol is used as side information for sub-blocks if the main information of a sub-block consists of zeros only.

10. A system as claimed in claim 9, characterized in that the hybrid encoder determines the motion vector for macro-blocks only.

11. A system as claimed in claim 10, characterized in that a macro-attribute from which it can be derived that side information is identical for all sub-blocks of a macro-block, is only used by the hybrid encoder if its use leads to a smaller number of bits for the side information as compared with the case in which the hybrid encoder would assign side information of the same content to each sub-block.

12. A system as claimed in claim 11, characterized in that the hybrid encoder treats macro-blocks like sub-blocks.

13. A system as claimed in claim 1, characterized in that the following macro-attributes are provided for chrominance values:

6. u v w,
7. x,
8. u v w in which the characters u, v, w, and x represent the following records:
   u: All sub-blocks are difference blocks,
   v: The motion vector is zero for all sub-blocks,
   w: The main information consists of zeros only for all sub-blocks,
   x: All sub-blocks are original blocks, the underlined characters being the negation, and the juxtaposition of characters representing the logical conjunction of their associated records.

14. A system as claimed in claim 13, characterized in that the hybrid encoder assigns a separate macro-attribute (NON) to a macro-block is it does not assign any of the remaining macro-attributes to this block, in which case the hybrid encoder assigns all side information to the separate sub-blocks of said macro-block.

15. A system as claimed in claim 14, characterized in that the END-OF-BLOCK symbol is used as side information for sub-blocks if the main information of a sub-block consists of zeros only.

16. A system as claimed in claim 15, characterized in that the hybrid encoder determines the motion vector for macro-blocks only.

17. A system as claimed in claim 16, characterized in that a macro-attribute from which it can be derived that side information is identical for all sub-blocks of a macro-block, is only used by the hybrid encoder if its use leads to a smaller number of bits for the side information as compared with the case in which the hybrid encoder would assign side information of the same content to each sub-block.

18. A system as claimed in claim 17, characterized in that the hybrid encode treats macro-blocks like sub-blocks.

* * * * *